United States Patent
Propst et al.

(10) Patent No.: US 12,252,033 B2
(45) Date of Patent: Mar. 18, 2025

(54) LOW TEMPERATURE SECONDARY BATTERY

(71) Applicant: Our Next Energy, Inc., Novi, MI (US)

(72) Inventors: Dylan Propst, Halifax, MI (US); Mujeeb Ijaz, West Bloomfield, MI (US)

(73) Assignee: Our Next Energy, Inc., Novi, MI (US)

( * ) Notice: Subject to any disclaimer, the term of this patent is extended or adjusted under 35 U.S.C. 154(b) by 0 days.

(21) Appl. No.: 18/082,794

(22) Filed: Dec. 16, 2022

(65) Prior Publication Data

US 2023/0191947 A1 Jun. 22, 2023

Related U.S. Application Data

(60) Provisional application No. 63/265,608, filed on Dec. 17, 2021.

(51) Int. Cl.
| | |
|---|---|
| B60L 58/18 | (2019.01) |
| B60L 50/60 | (2019.01) |
| B60L 58/25 | (2019.01) |
| H01M 10/44 | (2006.01) |
| H01M 10/48 | (2006.01) |
| H01M 10/615 | (2014.01) |
| H01M 10/625 | (2014.01) |
| H01M 50/509 | (2021.01) |

(Continued)

(52) U.S. Cl.
CPC ............ *B60L 58/18* (2019.02); *B60L 50/60* (2019.02); *B60L 58/25* (2019.02); *H01M 10/441* (2013.01); *H01M 10/443* (2013.01); *H01M 10/482* (2013.01); *H01M 10/486* (2013.01); *H01M 10/615* (2015.04); *H01M 10/625* (2015.04); *H01M 50/509* (2021.01); *H02J 7/0013* (2013.01); *H02J 7/00309* (2020.01); *H02J 7/007192* (2020.01); *H02J 9/061* (2013.01); *B60L 2210/10* (2013.01); *B60L 2240/545* (2013.01); *H01M 2220/20* (2013.01); *H01M 2300/0025* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 2018/0202409 A1* | 7/2018 | Hudson | ............... H01M 10/482 |
| 2019/0351776 A1 | 11/2019 | Du | |

(Continued)

FOREIGN PATENT DOCUMENTS

| | | |
|---|---|---|
| EP | 2209177 | 7/2010 |
| JP | 2019021402 | 2/2019 |

(Continued)

*Primary Examiner* — Carlos Amaya
*Assistant Examiner* — Aqeel H Bukhari
(74) *Attorney, Agent, or Firm* — Butzel Long (57) ABSTRACT

A power supply system that includes a traction battery, and a secondary battery that includes one or more hybrid modules having one or more low temperature chemistries. The power supply system also has one or more temperature sensors, and a switching device that connects or disconnects the secondary battery or the traction battery from a high-voltage DC (Direct Current) bus of an electric vehicle based on measurements of the one or more temperature sensors.

31 Claims, 8 Drawing Sheets

(51) Int. Cl.
  *H02J 7/00*          (2006.01)
  *H02J 9/06*          (2006.01)

(56) References Cited

U.S. PATENT DOCUMENTS

2019/0393451 A1* 12/2019 Ishihara ............ H01M 10/0525
2020/0317187 A1  10/2020 Assaliyski

FOREIGN PATENT DOCUMENTS

| KR | 20100051509 | 5/2010 |
| KR | 101772061 | 8/2017 |

\* cited by examiner

LOW TEMPERATURE SECONDARY BATTERY

TECHNICAL FIELD

The disclosure relates generally to low temperature secondary batteries and more specifically, to methods and systems for using low temperature secondary batteries in multi-chemistry power supply systems.

BACKGROUND

Batteries have been used for decades to supply power to a variety of different electrical and electro-mechanical devices. Early batteries, referred to as disposable batteries, were simply used until depleted and then discarded and replaced with one or more new batteries. Newer batteries such as electric vehicle (EV) batteries are capable of being recharged and then reused in the power supply systems of electric vehicles, therefore offering economic, environmental and ease-of-use benefits compared to other types of power supply systems. Although EV batteries may provide a long service life, their service life is not unlimited. Further, the temperature at which EV batteries are operated usually affects the performance of the battery. At low temperatures, batteries such as Lithium-ion batteries provide reduced performance or may stop operating entirely.

BRIEF SUMMARY

In one aspect, a method is disclosed. The method may include providing in a power supply system of an electric vehicle a traction battery includes one or more traction modules. The power supply system may also be provided with a secondary battery which comprises one or more hybrid modules having one or more low temperature chemistries. In the method a temperature of one or more cells may be determined using a temperature sensor. Upon the detected temperature meeting a low temperature threshold condition, a switching device (such as a contactor or relay) may be operated in a first mode of operation in which the secondary battery is electrically coupled to the high voltage Direct Current (DC) bus and the traction battery is electrically coupled to the secondary battery. Upon the temperature no longer meeting the low temperature threshold, the switching device may be operated in a second mode of operation in which the traction battery is electrically coupled to the high voltage DC bus and the secondary battery is electrically coupled to the traction battery.

The method may also include dynamically switching the modes to enable the power supply system to meet a desired power output or range requirement for loads of the electric vehicle regardless of ambient whether conditions. Further, in the first mode, the traction battery may be passively heated through its internal resistance or actively by an external resistive heating element, by discharging the traction battery to transfer power to the secondary battery while said secondary battery concurrently provides the electric vehicle with power via the high-voltage DC bus.

In one aspect, a power supply system is disclosed. The power supply system may include a traction battery and a secondary battery. The traction battery may include one or more traction modules and the secondary battery may include one or more hybrid modules having one or more low temperature chemistries. The power supply system may further have one or more temperature sensors, and a switching device that connects or disconnects the secondary battery or the traction battery from a high-voltage DC (Direct Current) bus of an electric vehicle based on measurements of the one or more temperature sensors to operate the vehicle between defined operation modes.

In another aspect, a computer system is disclosed. The computer system may include a processor and a memory storing instructions that, when executed by the processor, enable the system to determine a temperature of one or more cells of a power supply system using a temperature sensor, and upon a low temperature threshold condition being met, operate a switching device in a first mode of operation in which the secondary battery is electrically coupled to the high voltage Direct Current (DC) bus and the traction battery is electrically coupled to a secondary battery. Upon the low temperature threshold no longer being met the switching device may be controlled in a second mode of operation in which the traction battery is electrically coupled to the high voltage DC bus and the secondary battery is electrically coupled to the traction battery.

In yet another aspect, a non-transitory computer-readable storage medium is disclosed. The non-transitory computer-readable storage medium may store instructions that when executed by a computer, cause the computer to determine a temperature of one or more cells of a power supply system using a temperature sensor, and upon a low temperature threshold condition being met, operate a switching device in a first mode of operation in which the secondary battery is electrically coupled to the high voltage Direct Current (DC) bus and the traction battery is electrically coupled to a secondary battery. Upon the low temperature threshold condition no longer being met the switching device may be controlled in a second mode of operation in which the traction battery is electrically coupled to the high voltage DC bus and the secondary battery is electrically coupled to the traction battery.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The illustrative embodiments are directed to using low temperature tolerating chemistries in a power supply system to enhance a performance of the power supply system regardless of ambient temperature. The illustrative embodiments recognize that cold temperatures may increase the internal resistance of batteries and low their capacity. For example, a battery that may provide 100 percent capacity at 27° C. may typically deliver only 50 percent at −18° C. Some batteries may have an optimum service life if used at around room temperature, for example 20° C. or slightly below. If, for example, the battery is operated at 30° C. instead, its cycle life may be reduced by 20 percent, for example. At 40° C., the loss may exacerbate to 40 percent, and if charged and discharged at 45° C., the cycle life may be only half of the cycle life at 20° C.

Further, the performance of said batteries may drop with decreasing temperatures. For example, at −20° C. the batteries may retain about 50 percent performance level. However, the illustrative embodiments recognize that the momentary capacity-decrease may differ with battery chemistry. Nickel Cadmium (NiCd), for example may be operated at −40° C., albeit at a discharge rate of about 0.2C. Lithium titanite (LTO), has good low temperature performance and is able to discharge 80% of its capacity at −30° C. Nickel metal hydride and Lead Acid may also serve as low temperature chemistries. Functional electrolytes containing multiple additives may enable lithium-ion to perform well in a wide temperature range from −40 to 60° C. Electrolytes made from liquefied gas solvents—gases that may be liquefied under moderate pressures—may be more resistant to freezing than standard liquid electrolytes and may improve the energy density and cyclability of batteries to run at even lower temperatures down to −100° C. Some lithium-ion polymer cells may have an operating temperature: −50° C. to 50° C. Further, cold temperature operation performance of lithium-ion battery cells may be enhanced by using a modified liquid electrolyte which has lithium salts that remain molten at low to moderate temperatures. These low temperature chemistries may also provide a high temperature storage performance for the secondary battery compared to the storage performance of other chemistries (e.g. they may be stored between, for example, −40° C. to 60° C.).

Thus, in a dual chemistry pack, where one primary battery with a first chemistry is used for everyday use, and a second auxiliary battery with a second chemistry is used for low cycle life extended range, the auxiliary/second chemistry may be designed and the corresponding battery controlled such that there may be a full functioning of the pack at low temperatures. The Auxiliary chemistry may be able to accept charge, or provide discharge, or both until the primary chemistry is at a desired temperature such that there is little to no loss of use during low temperatures (e.g., low ambient and/or cell temperatures) of the pack.

By shifting/offsetting the usage of batteries in differing temperatures for the two different chemistries, there may be the possibility of eliminating the usage of pack heating elements which typically reduce the overall efficiency of the pack design and introduce added complexity. For example, since lithium iron phosphate cells may not allow for full charge currents during sub −20° C. temperatures, corresponding vehicles may be required to use a heating technology to heat the cells to a temperature that allows the vehicle to operate at full capacity. The heating elements may add complexity and cost to a pack. The illustrative embodiments recognize that by selecting an auxiliary chemistry that can operate and accept full charge currents at temperatures below −20° C., for example, and controlling said chemistries dynamically in tandem with a primary chemistry, the vehicle may be able to eliminate the use of heating element, associated costs, vehicle power efficiency losses, that lower the overall usage of a battery pack range. Further, since said low temperature conditions may be temporary, by using auxiliary chemistries that may have high energy densities, albeit with a low cycle life, said auxiliary chemistry may not need to experience high cycling. Further, this can be extended to high temperature environments in which certain primary chemistries may not function well, wherein tertiary batteries configured with high temperature chemistries may be controlled to provide power to an electric vehicle during excessive heating conditions without associated battery safety concerns.

The illustrative embodiments recognize that architectures and routines to control a plurality of different battery types under different criteria while meeting the power output and range requirements of an electric vehicle load regardless of ambient temperature is an extremely complex undertaking.

Certain operations are described as occurring at a certain component or location in an embodiment. Such locality of operations is not intended to be limiting on the illustrative embodiments. Any operation described herein as occurring at or performed by a particular component, e.g., operating a switching device, can be implemented in such a manner that one component-specific function causes an operation to occur or be performed at another component, e.g., at a local or remote system.

An embodiment may provide in a power supply system a traction battery comprising one or more traction modules, a secondary(auxiliary) battery comprising one or more hybrid modules having one or more low temperature chemistries; one or more temperature sensors; and a switching device. The switching device may be configured to connect or disconnect the secondary battery or the traction battery from a high-voltage DC (Direct Current) bus of an electric vehicle based on measurements of the one or more temperature sensors. Herein, responsive to determining that the temperature of one or more cells meets a low temperature threshold condition (e.g. is below a low temperature threshold), the switching device may electrically couple the secondary battery to the high voltage DC bus and electrically couple the traction to the secondary battery, and responsive to determining that temperature no longer meets the low temperature threshold condition(e.g. is at or above the low temperature threshold, at least above the low temperature threshold, etc), the switching device electrically couples the traction battery to the high voltage DC bus and electrically couple the secondary battery to the traction battery.

Another embodiment may provide a corresponding bi-directional DC-DC-converter for each of the one or more hybrid modules. Herein the corresponding bi-directional DC-DC-converter of a hybrid module may be configured to control a charging and discharging of a plurality of cells of the hybrid module to produce a desired charge or discharge rate respectively.

Further, a tertiary battery may be provided. The tertiary battery may comprise one or more hybrid modules having one or more high temperature chemistries and the switching device may be operated to, responsive to determining that the temperature is above the low temperature threshold and at or above a high temperature threshold, electrically couple the tertiary battery to the high voltage DC bus.

In an exemplary embodiment of the power supply system, each hybrid module of the secondary or tertiary battery may comprises high energy density hybrid modules and each module may comprise cells connected in series with the hybrid modules being connected in parallel. Each hybrid module may include corresponding hybrid module controller (HMC) to control charging and discharging of the hybrid module and each cell of the plurality of cells may be independently measurable by the HMC.

The illustrative embodiments are further described with respect to processes achieved using certain types of data, functions, equations, configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific communications, code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
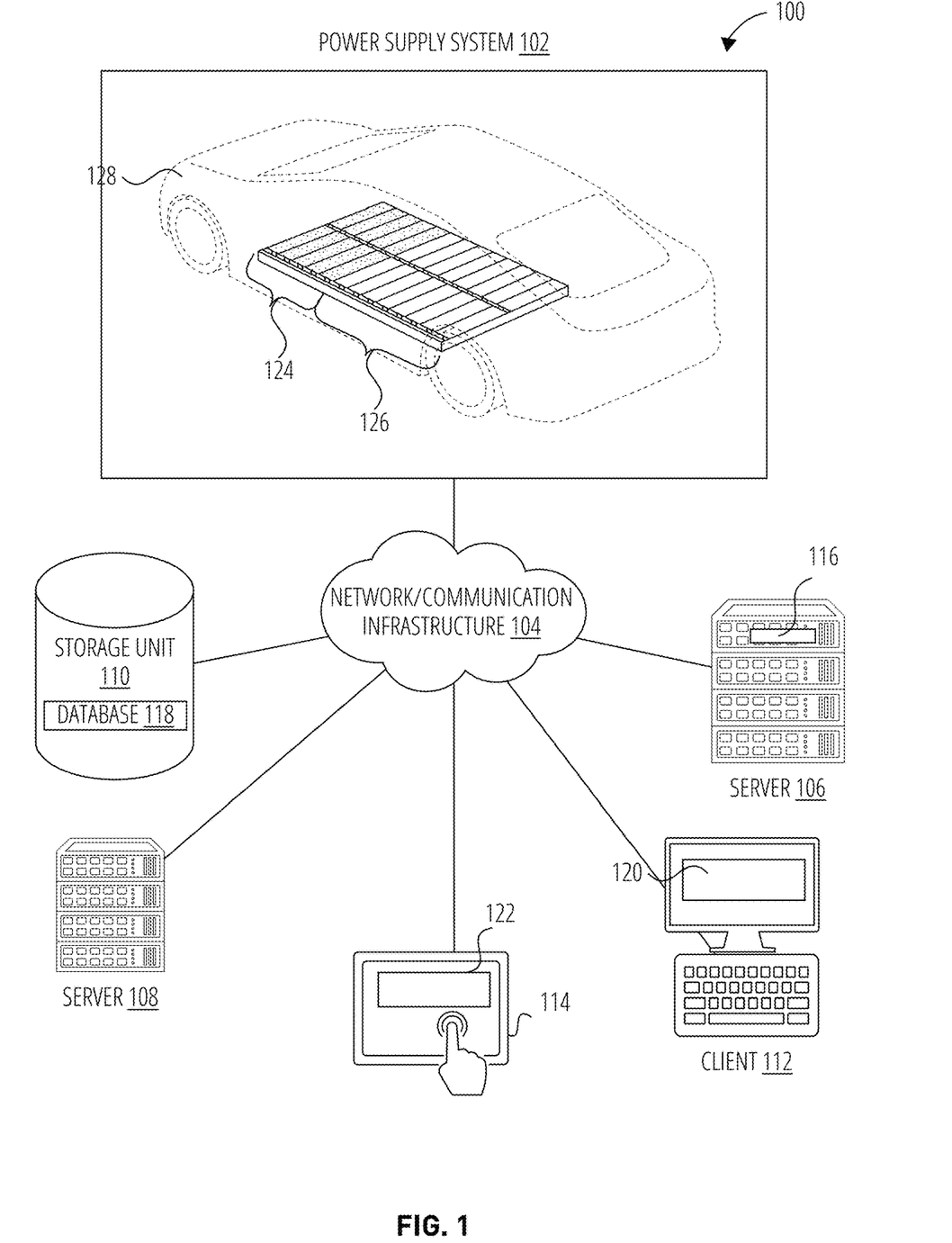
FIG. 1 depicts a block diagram of a power supply environment including a network of data processing systems in which illustrative embodiments may be implemented.
Figure 2:
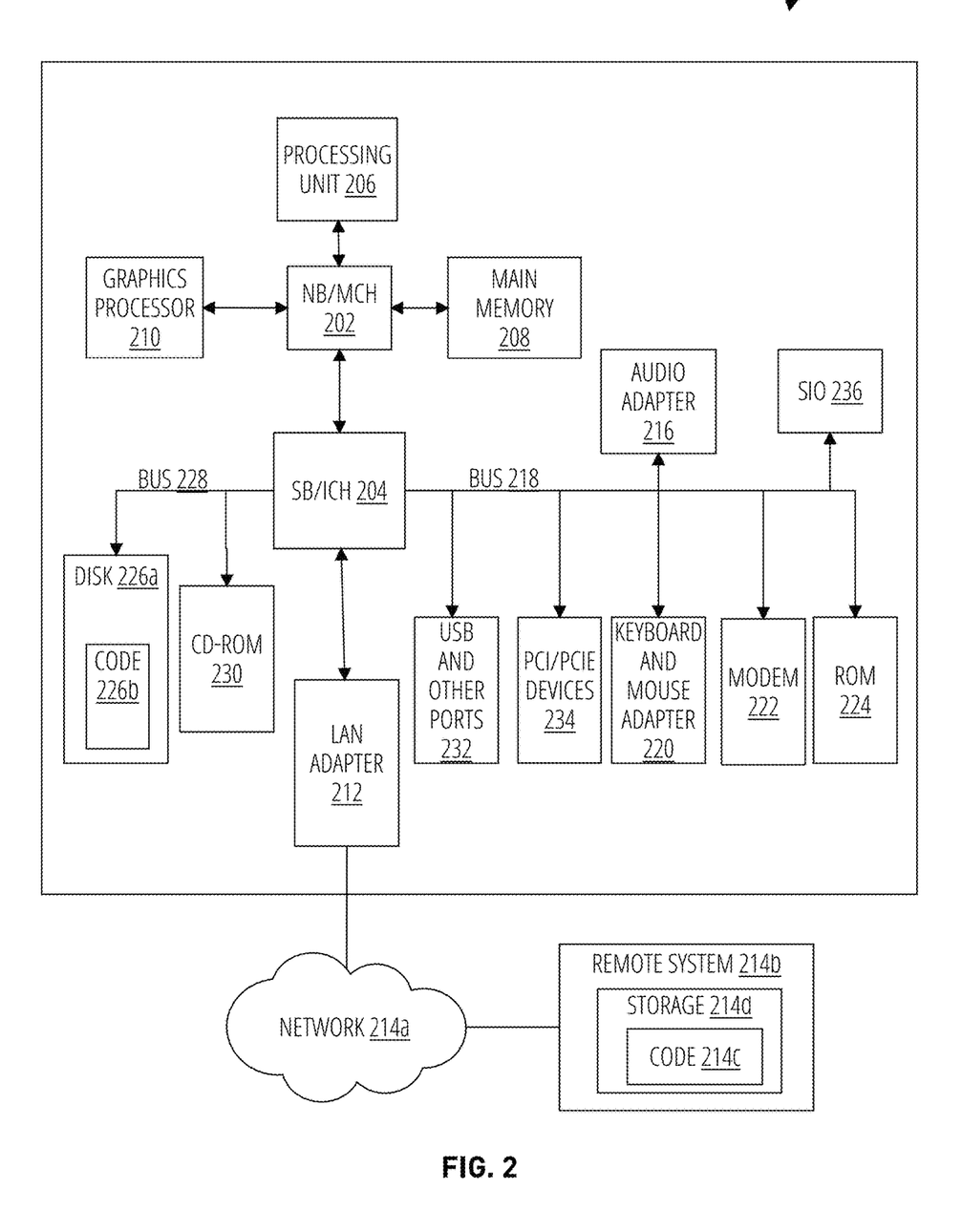
FIG. 2 depicts a block diagram of a data processing system in which illustrative embodiments may be implemented.

With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 depicts a block diagram of a power supply environment 100 in which illustrative embodiments may be implemented. Power supply environment 100 includes network/communication infrastructure 104. Network/communication infrastructure 104 is the medium used to provide communications links between various devices, databases and computers connected together within power supply environment 100. Network/communication infrastructure 104 may include connections, such as wire, wireless communication links, or fiber optic cables. The environment includes a power supply system 102 and clients or servers configured to perform one or more processes herein. The power supply system 102 includes a traction battery 124 which may comprise one or more traction modules and a secondary battery 126 which may comprise one or more hybrid modules. A dashboard 114 and a dashboard application 122 may be part or separate from power supply system 102. The dashboard application 122 may be operable to control parameters of the power supply system 102 including, for example, low temperature thresholds and/or high temperature thresholds.

Clients or servers are only example roles of certain data processing systems connected to network/communication infrastructure 104 and are not intended to exclude other configurations or roles for these data processing systems or to imply a limitation to a client-server architecture. Server 106 and server 108 couple to network/communication infrastructure 104 along with storage unit 110. Software applications, such as embedded software applications may execute on any computer or processor or controller in power supply environment 100. Client 112, dashboard 114 may also be coupled to network/communication infrastructure 104. Client 112 may be a remote computer with a display. A data processing system, such as server 106 or server 108, or clients (client 112, dashboard 114) may contain data and may have software applications or software tools executing thereon.

As another example, an embodiment can be distributed across several data processing systems and a data network as shown, whereas another embodiment can be implemented on a single data processing system within the scope of the illustrative embodiments. Data processing systems (server 106, server 108, client 112, dashboard 114) also represent example nodes in a cluster, partitions, and other configurations suitable for implementing an embodiment.

Client application 120, dashboard application 122, or any other application such as server application 116 may implements an embodiment described herein. Any of the applications can use data from power supply system 102 and to partially or fully perform one or more processes described herein. The applications can also obtain data from storage unit 110 for power supply purposes. The applications can also execute in any of data processing systems (server 106 or server 108, client 112, dashboard 114).

Server 106, server 108, storage unit 110, client 112, dashboard 114, may couple to network/communication infrastructure 104 using wired connections, wireless communication protocols, or other suitable data connectivity. Client 112, and dashboard 114 may be, for example, mobile phones, personal computers or network computers.

In the depicted example, server 106 may provide data, such as boot files, operating system images, and applications to client 112, and dashboard 114. Client 112, and dashboard 114 may be clients to server 106 in this example. Client 112, and dashboard 114 or some combination thereof, may include their own data, boot files, operating system images, and applications. Power supply environment 100 may include additional servers, clients, and other devices that are not shown.

Network/communication infrastructure 104 may represent a collection of networks and gateways that use the Transmission Control Protocol/Internet Protocol (TCP/IP) and other protocols to communicate with one another. Of course, power supply environment 100 also may also utilize a number of different types of networks, such as for example, an intranet, a local area network (LAN), or a wide area network (WAN). FIG. 1 is intended as an example, and not as an architectural limitation for the different illustrative embodiments.

With reference to FIG. 2, this figure depicts a block diagram of a data processing system in which illustrative embodiments may be implemented. Data processing system 200 is an example of a computer, such as client 112, dashboard 114, server 106, or server 108, in FIG. 1, or another type of device in which computer usable program code or instructions implementing the processes may be located for the illustrative embodiments.

Data processing system 200 is described as a computer only as an example, without being limited thereto. Implementations in the form of other devices, in FIG. 7, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) 226a and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226a and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218.

Memories, such as main memory 208, read only memory (ROM) 224, or flash memory (not shown), are some examples of computer usable storage devices. Hard disk drive (HDD) or solid-state drive (SSD) 226a, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices.

Instructions for the operating system, and applications or programs, (such as server application 116, or client application 120 or dashboard application 122) are located on storage devices, such as in the form of codes 226b on Hard disk drive (HDD) or solid-state drive (SSD) 226a, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226b may be downloaded over network 214a from remote system 214b, where similar code 214c is stored on a storage device 214d in another case, code 226b may be downloaded over network 214a to remote system 214b, where downloaded code 214c is stored on a storage device 214d.

The hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. In addition, the processes of the illustrative embodiments may be applied to a multiprocessor data processing system.

A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

The depicted examples in FIG. 1 and FIG. 2 and above-described examples are not meant to imply architectural limitations.

Figure 3:
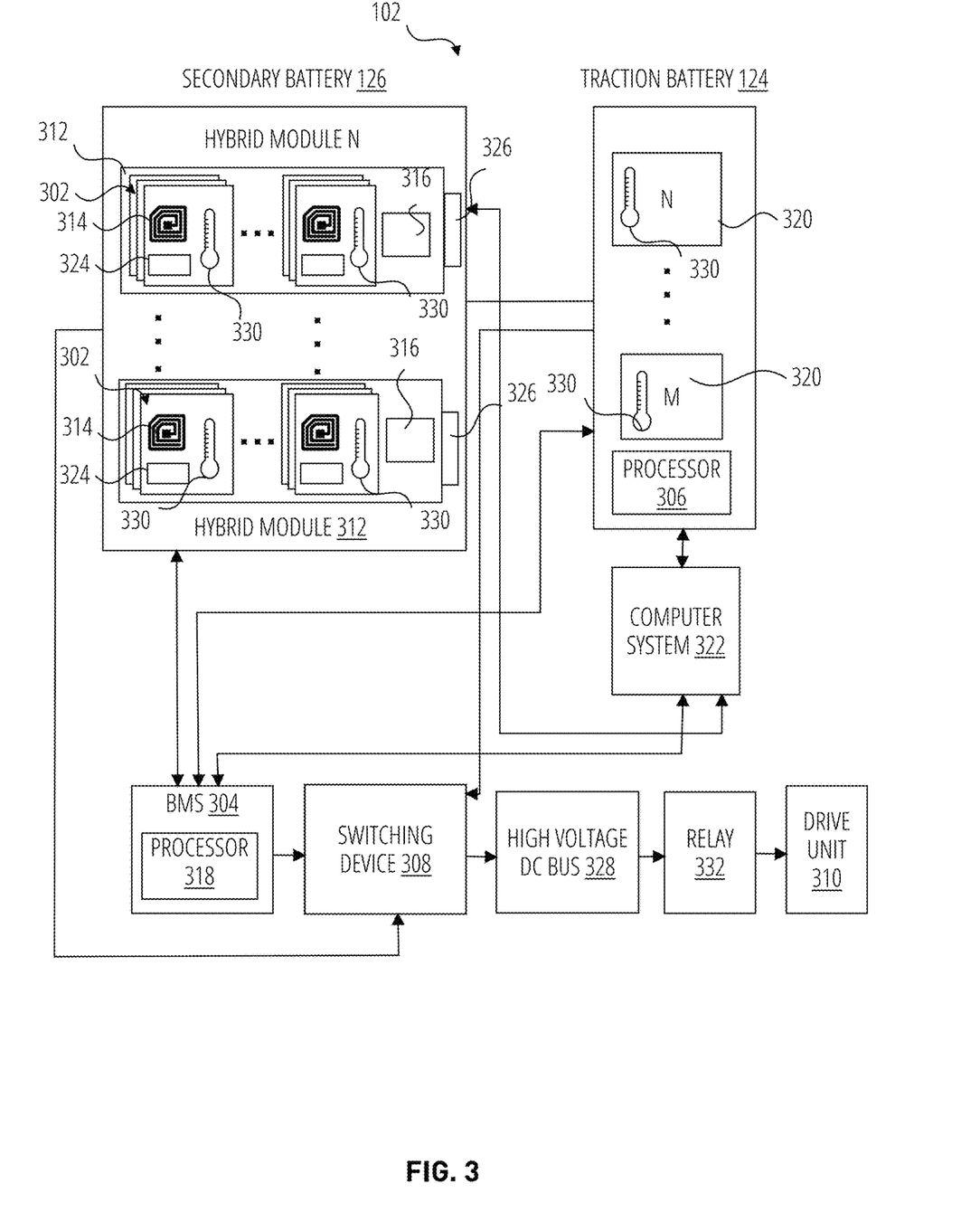
FIG. 3 depicts a block diagram of a power supply system in which illustrative embodiments may be implemented.

Turing to FIG. 3, a power supply system 102 is shown. The power supply system 102 may include a traction battery 124 which may include one or more traction modules 320 having high power chemistries such as lithium-ion phosphate chemistries and being configured to power the vehicle in a normal operating mode. The one or more traction modules 320 may be connected in series in an embodiment. The traction modules 320 or traction battery 124 may also have one or more temperature sensors 330 configured to measure a temperature of the traction battery 124 or traction module 320 or ambient temperature. In an illustrative embodiment, there may be a plurality of temperature sensors inside the pack and all temperature readings may be considered to optimize the power output of the entire battery system. The secondary battery 126 may be designed to be modular, having one or more than one a low temperature chemistries, different from the chemistry of the traction battery 124, for the purpose of providing the vehicle with its varying power requirements when needed, including at low temperatures such as temperatures below −20° C. Thus, the secondary battery 126 may be designed to have one or a plurality of hybrid modules 312 or packs that are configured with respective bi-directional DC-DC converters 326 to act as standalone batteries. By being able to independently control the hybrid modules 312, and independently measure the health or state of its individual cells 302, a charging and discharge rate the cells 302 may be regulated. In an embodiment, cells 302 of the hybrid modules 312 are arranged in series. By using a balance device 324 such as a bleeder resistor connected in parallel with each cell 302, a rate of charging or discharging of the cell 302 may be controlled, i.e., turning on the bleeder resistor for a cell, discharges the electric charge stored in the cell. Further, one or more sensors 314 (such as a voltage sensor) are used to measure a state of the individual cells 302 and/or the hybrid module 312. Said sensors 314 may include or be separate from temperature sensors 330 configured to measure a temperature of the cells or ambient temperature. In an embodiment, a plurality of measured temperatures from a plurality of sensors may be averaged or analyzed to determine a final temperature for use in processes described herein.

Each hybrid module 312 of the secondary battery 126 may also have an operatively coupled hybrid module controller 316 (HMC) for measuring a health or state of the cells 302. For example, a hybrid module controller 316 may be configured to measure the voltage, current, temperature, SOC (State of Charge), SOH (State of Health) for all cells of the corresponding hybrid module 312. It may also have a DC-DC converter control to allow isolation and current to be managed and throttle their contribution, both absorbing and providing energy to a main bus/high voltage DC bus 328 of the power supply system 102. The system may also have a BMS 304 configured to primarily communicate with the traction battery 124. In case a traction battery 124 malfunctions, one of more of the hybrid module 312 can act as a replacement, (e.g., temporary replacement) in a normal operating mode for the traction battery 124 by supplying power directly to the drive unit 310. One or more processors (processor 318, processor 306 or a processor of computer system 322) are used in a number of configurations to enable the performance of one or more processes or operations described herein. The power supply system 102 may also comprise a switching device 308 which may be controlled to operatively couple a drive unit 310 or load of the vehicle to power from the power supply system 102. The switching device 308 may comprise relays or contactors configured to couple power from the battery to the load or drive unit 310. The switching device 308 may be, for example, a junction box that includes a temperature sensor that detects a temperature of a circuit for vehicle operation (such as the temperature of cells of the traction battery or secondary battery or ambient temperature). The switching device 308 may also comprise a controller or receive instructions from another controller such as the BMS 304 that, when the temperature of a circuit for vehicle travel reaches or exceeds a preset threshold, controls and switches on a preset operational mode according to predetermined criteria. Of course, the switching device is not limited to a junction box and can also, for example, be configured as the hybrid module controllers 316. The hybrid module controllers 316 may have access to the temperatures of the cells and may work together to self-connect or self-disconnect corresponding hybrid modules 312 from the high voltage DC bus 328 and/or from the traction battery 124 based on said temperature meeting a preset threshold condition. Thus, by selectively coupling the traction and secondary batteries to the drive unit 310 in tandem, the batteries may be controlled to provide the vehicle with its required power output regardless of ambient whether conditions. Operating the bi-directional DC-DC converters 326 of the hybrid modules 312 individually allows defined charging and discharging rates of the hybrid modules 312 to be obtained regardless of changing load requirements of the electric vehicle. Thus, in a normal operating mode, the secondary batteries may be operated to charge the traction battery and may additionally provide range extension to the electric vehicle, whereas in low temperature modes, when the power output of the traction battery is sub-par, the secondary battery 126 may provide the power requirements of the vehicle until the traction battery regains its full discharge capacity.

Other relays 332 or contactors may be disposed between the high voltage DC bus 328 and the drive unit 310 to operatively couple the drive unit 310 of the vehicle to power from the power supply system. The illustrated example connections are thus not meant to be limiting as other connections and architecture may be obtained based on descriptions herein. The drive unit 310 may collectively refer to devices outside the power supply system 102 such as a propulsion motors, inverter, HVAC (Heating, Ventilation, and Air Conditioning) system, etc.

In an embodiment, the plurality of hybrid modules 312 may be connected in parallel to the main traction bus/high voltage DC bus, a plurality of traction modules 320, and a plurality of bi-directional DC-DC converters 326. In addition, it may have an on-board AC-DC charger, a 12 V battery for powering lights and ignition of the vehicle, an auxiliary DC-DC converter for connecting the 12 V battery to the lights and ignition, contactors for switching various circuits on or off, and a control module for controlling the power supply. An operatively coupled hybrid module controller 316 such as an on-board hybrid module controller 316 is configured to measure the voltage, current, temperature, SOC and SOH of the each of the individual cells 302. Each of the cells 302 may have a voltage sensor 314. Knowing the current passing through the cell 302 and temperature (such as temperature of various points on the hybrid module 312), the SOH, SOC and other parameters for the cells 302 can be calculated to determine whether energy output of the corresponding hybrid module 312 can be connected to the traction battery 124. Moreover, by using a bi-directional DC-DC converter 326 for each hybrid module 312, the current input and output for each hybrid module 312 can be precisely controlled unlike in load following solutions which have no control over changing drive power. In an illustrative embodiment, charge and discharge pulses are generated for the hybrid modules 312. By controlling the current for the series connected cells 302 of the hybrid module 312 through a bi-directional DC-DC converter 326 and measuring the voltages of each of the cells 302, the impedances of said each of the cells 302 are computable and comparable to reference data, in order to identify any unwanted deviations in a cell impedance and a corresponding change in the health of the cell.

Further, the hybrid module controller 316 may manage the strain of the cells 302 by monitoring and bringing them into alliance. For example, when one cell 302 (Cell A) is determined to be at a lower SOC (e.g., 20%) than another cell 302 (Cell B) that is connected in series (70%), Cell B will reach a full charge earlier than Cell A, thus requiring the charging of Cell B to be halted to prevent overcharging it. By reducing the SOC of Cell B to that of Cell A using the balance device 324 (e.g., bleeder resistor), Cell A and Cell B can both be charged at the same rate to a predetermined full charge. Thus, the hybrid module controller 316 may keep the SOC of the cells 302 equal or substantially equal (e.g., within +/−10%, or +/−5%, +/−1%,) such that a defined range of the module can be used. In another example, by determining cells 302 with lower self-discharge rates than that of other cells 302, the hybrid module controller 316 determines which cells 302 to selectively discharge to a determined charge in order to subsequently charge all cells 302.

In another illustrative embodiment, because the hybrid modules 312 are connected in parallel to each other and independently controlled, an individual hybrid module 312 is separately removable for reconditioning by slowing charging and discharging within a selected SOC range without affecting the normal operation of the power supply system 102.

Figure 4:
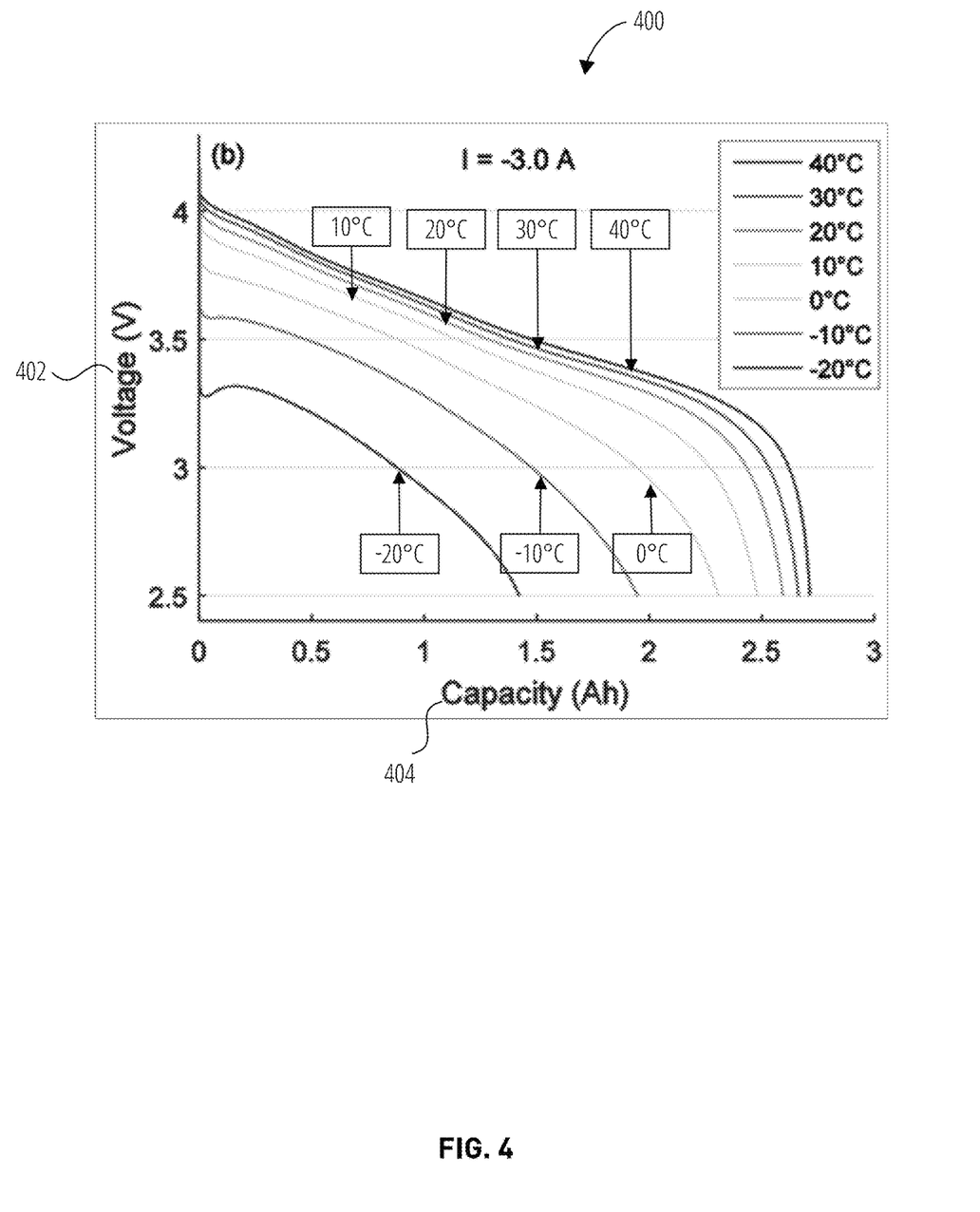
FIG. 4 depicts a discharge voltage-capacity chart of a lithium-ion cell.

FIG. 4 depicts a discharge voltage-capacity chart 400 of a lithium-ion cell for illustration. The figure illustrates the discharge voltage of a lithium-ion cell at 3A and under various temperatures ranging from −20° C. to 40° C. It can be seen that at reduced temperatures, such as at −20° C., the available discharge voltage is reduced compared to the discharge voltage at 40° C. and the capacity is a fraction of the capacity at 40° C. The reduced capacity at low temperatures may apply while the cell is in the low temperature condition and may recover with increasing temperature.

The intercalation of lithium ions on a graphite electrode and a lithium plating process may happen at the same time at low temperatures. The diffusion of lithium ions in graphite may be impeded under cold conditions, and the conductivity of the electrolyte may be lowered, lowering the intercalation rate. As a result, lithium plating occurs more easily on the graphite surface, resulting in a rise in the thickness of the solid electrolyte interface (SEI). Assuming the voltage remains constant, and the discharge current reduces, the battery's power output will decrease as well, resulting in a reduced output. Further, low temperatures may increase an electrolyte's viscosity and tension, making diffusion and movement of lithium ions between positive and negative electrodes more difficult. The battery's ability to function correctly may be harmed as a result of the higher resistance. The primary result may be a reduction in power output efficiency, as the majority of the battery's power may be spent to generate heat to reduce battery resistance. Lastly, at low temperatures, the activity of the lithium ions in the positive electrode material may reduce. Cold temperatures may raise the electrolyte's resistance and reduce the transfer rate of lithium ions, lowering the amount of energy available. Depending on the temperature and discharge rating, this could result in a capacity loss of up to 80% or more. However, the reduced capacity may recover as the temperature rises again.

Figure 5:
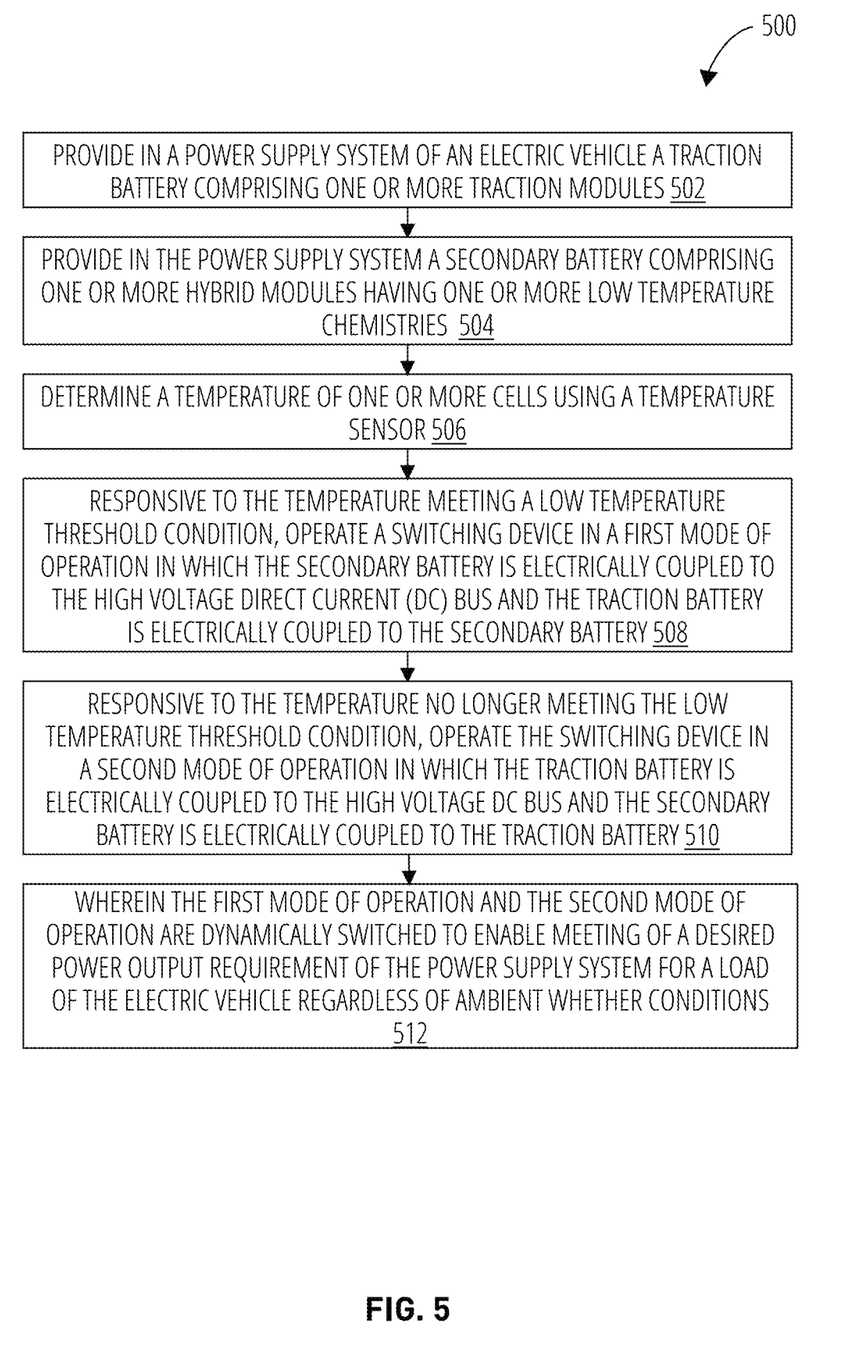
FIG. 5 depicts a flowchart of a process in accordance with illustrative embodiments.
Figure 7:
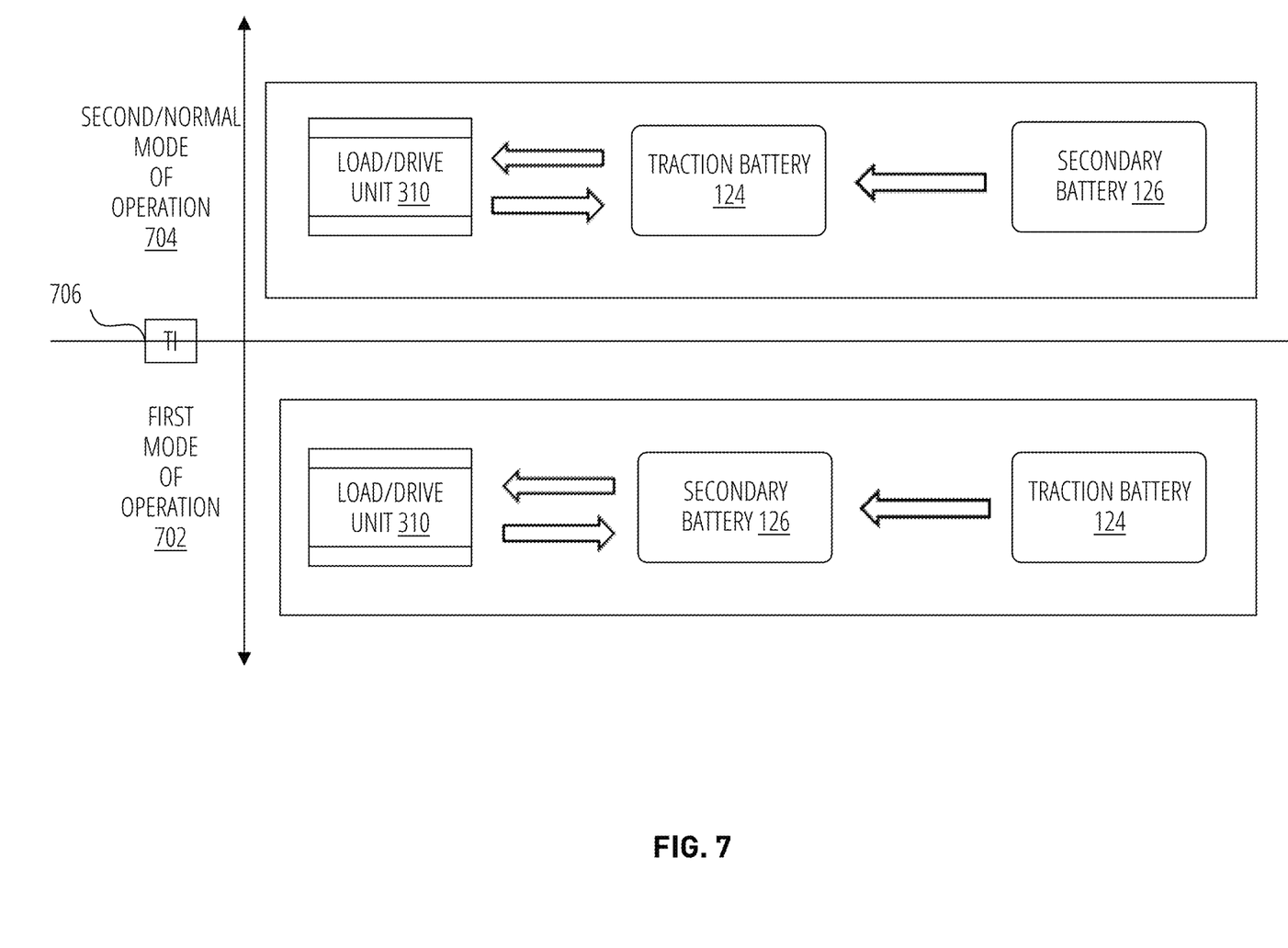
FIG. 7 depicts a block diagram showing modes of operation a power supply system in accordance with illustrative embodiments.

FIG. 5 shows a flowchart of a process 500 in which embodiments may be implemented. The process 500 begins at step 502, wherein the process 500 provides in a power supply system of an electric vehicle a traction battery comprising one or more traction modules. In step 504, process 500 provides in the power supply system a secondary battery comprising one or more hybrid modules having one or more low temperature chemistries. In step 506, process 500 determines a temperature of one or more cells of the power supply system using a temperature sensor. In step 508, process 500, responsive to the temperature being below a low temperature threshold, operates a switching device in a first mode of operation 702 in which the secondary battery is electrically coupled to the high voltage Direct Current (DC) bus and the traction battery is electrically coupled to the secondary battery. In step 510, process 500, responsive to the temperature being at or above the low temperature threshold, operates the switching device in a second mode of operation 704 in which the traction battery is electrically coupled to the high voltage DC bus and the secondary battery is electrically coupled to the traction battery. In step 512, process 500 dynamically switches the first mode of operation and the second mode of operation to enable provision of a desired power output of the power supply system for a load of the electric vehicle regardless of ambient weather conditions. Herein, the range of the vehicle may be always maintained.

In the first mode of operation 702, as shown in FIG. 5 and FIG. 7, the process 500 may passively heat the traction battery, via an internal resistance of one or more cells of the traction battery, by discharging the traction battery to transfer power to the secondary battery while the secondary battery concurrently provides the electric vehicle with power via the high-voltage DC bus. In this mode of operation, the discharge of the traction battery to the secondary battery is enables by the bi-directional DC-DC converter 326. For example, while one or more hybrid modules 312 of the secondary battery 126 may be fully charged and may be employed to provide the power output requirements of the power supply system 102, one or more other hybrid modules may have depleted charges and the BMS 304 may operate the switching device 308 to electrically couple the traction battery to one or more of said depleted hybrid modules having, via their corresponding bi-directional DC-DC converters 326 to charge them. Through said charging, the internal resistance of the traction battery 124, typically high at low temperatures, may cause the traction battery to heat up. Though the power output of the traction battery 124 may be lower at said low temperature, since said power output is temporarily not being applied to the drive unit 310, the power requirements of the vehicle may still be met by the secondary battery 126.

In the second mode of operation 704 as shown in FIG. 5 and FIG. 7, process 500 may operate the electric vehicle 128 in a normal mode. Herein the traction battery 124 may resume provision of power to the drive unit 310 and the secondary battery may be operated to provide range extension to the electric vehicle 128.

Figure 6:
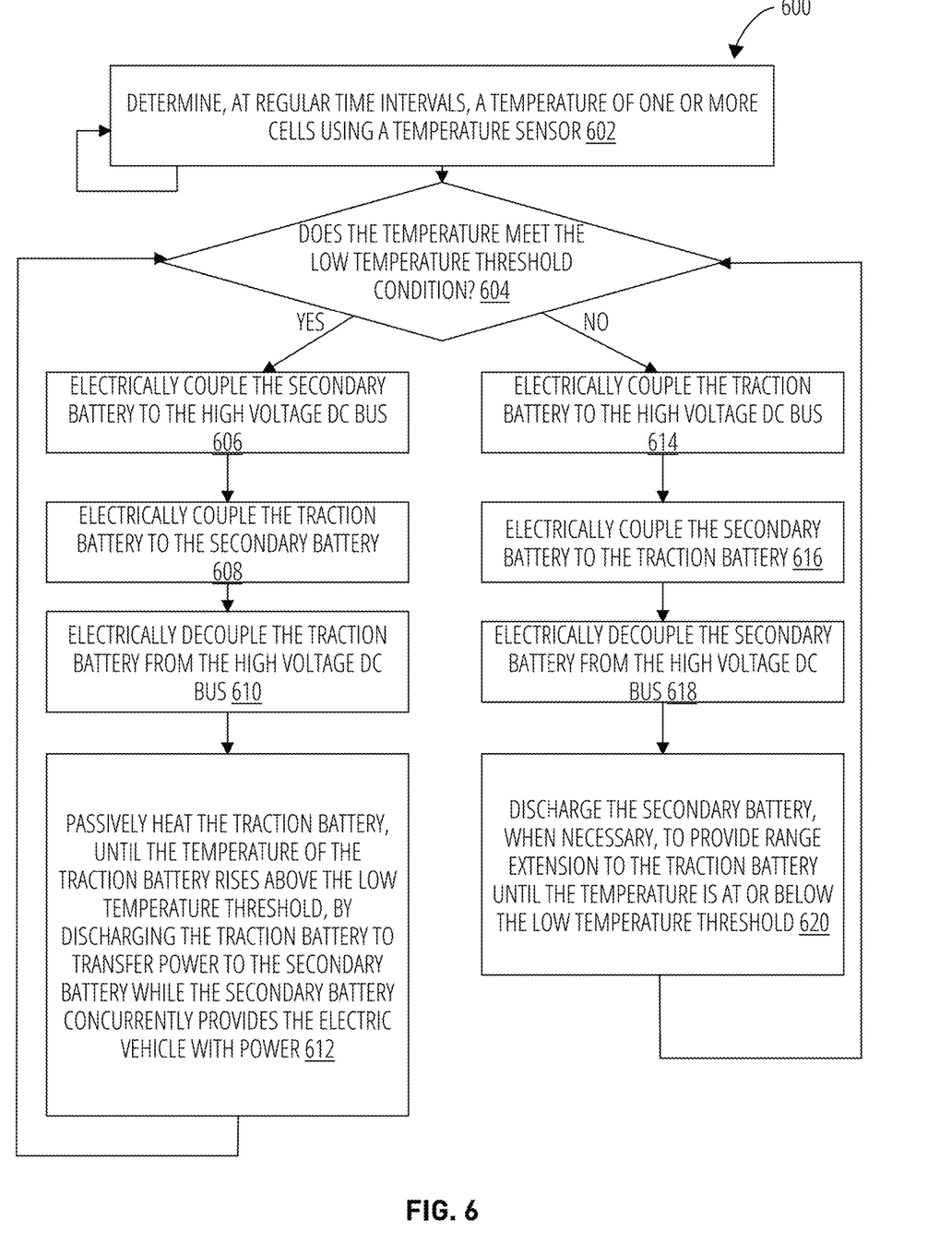
FIG. 6 depicts a flowchart of a process in accordance with illustrative embodiments.

FIG. 6 shows an example process 600 of the process 500 of FIG. 5. The process 600 may be performed by, for example, the BMS 304 and/or the hybrid module controllers 316. The process 600 may begin at step 602, wherein process 600 determines, at regular time intervals (e.g., every 2 minutes), a temperature of one or more cells of the power supply system using a temperature sensor 330. In step 604, process 600 determines if the temperature is below a low temperature threshold 706 ("Tl", FIG. 7). Upon determining that the low temperature threshold 706 condition has been met, the process 600 electrically couples the secondary battery 126 to the high voltage DC bus in step 606. In step 608, process 600 electrically couples the traction battery 124 to the secondary battery 126. In step 610, process 600 electrically decouples the traction battery 124 from the high voltage DC bus to prevent the traction battery from providing power to the load/drive unit 310. The coupling and decoupling may be performed concurrently such that the electric vehicle 128 is provided with power at all times. In an example, the coupling and decoupling may be performed simultaneously, though in practice, small differences in time may be observed.

In step 612, process 600 may passively heat the traction battery 124, via an internal resistance of one or more cells of the traction battery 124, and in some cases via an external heating element, until the temperature of the traction battery is at or rises above the low temperature threshold 706 ("Tl"), by discharging the traction battery 124 to transfer power to one or more modules of the secondary battery 126 via the bi-directional DC-DC converters 326 while the secondary battery 126 concurrently provides the electric vehicle with power via the high-voltage high voltage DC bus 328. The process repeats until said temperature is at or rises above the low temperature threshold 706. Of course, other temperature conditions are possible in light of the descriptions herein. By using the passive heating in combination with a temperature measurement/detection the need for a heater to heat the traction battery 124 during cold temperatures may be eliminated. Further, in this configuration, the secondary battery may be controlled to provide the electric vehicle with power, in a cold start process, at a same output and efficiency as an efficiency of the traction battery in non-low temperature conditions/warm temperature conditions (e.g., at room temperature).

Upon determining that the low temperature threshold condition is no longer met, process 600 may switch to a normal/second mode of operation 704 wherein the process 600 electrically couples the traction battery to the high voltage DC bus. In step 616, process 600 electrically couples the secondary battery to the traction battery. In step 618, process 600 electrically decouples the secondary battery from the high voltage DC bus. In step 620, process 600 discharges the secondary battery, when needed, using the bi-directional DC-DC converters, to provide range extension to the traction battery until the temperature is below the low temperature threshold. For example, the secondary battery 126 may be designed to have a plurality of high energy density hybrid modules or packs that are configured with respective DC-DC converters to act as standalone batteries. Should additional energy be required beyond the capacity provided by the high-power traction battery, such power maybe supplemented by the high energy density hybrid modules. Each hybrid module may include cells connected in series the hybrid modules may be connected in parallel, each high energy density hybrid module including a corresponding hybrid module controller (HMC), and each cell of the plurality of cells being independently measurable by the HMC.

In an illustrative embodiment, the low temperature threshold 706 ("Tl") is selected to be proportional (e.g., equal to) to a temperature at which the one or more cells of the traction battery begins to experience a decrease in discharge capacity. The low temperature threshold may be, for example, −20° C. Further, in selecting the secondary battery chemistry, a low temperature chemistry that also provides a high energy density (e.g., between 700-1500 Wh/L, or more) may be selected. In another embodiment a combination of low temperature chemistries may be selected for the secondary battery 126. One or more low temperature chemistries may comprise modified liquid electrolytes which have lithium salts that remain molten at low to moderate temperatures. One or more low temperature chemistries have a low cycle life which ranges from 4000 to 8000 or in some cases less than 4000 cycles such as 100-400 cycles.

In selecting the traction battery chemistry, chemistry that provides a high cycle life(e.g., 8000 cycles or more or in some more than 2000 cycles) may be selected.

Figure 8:
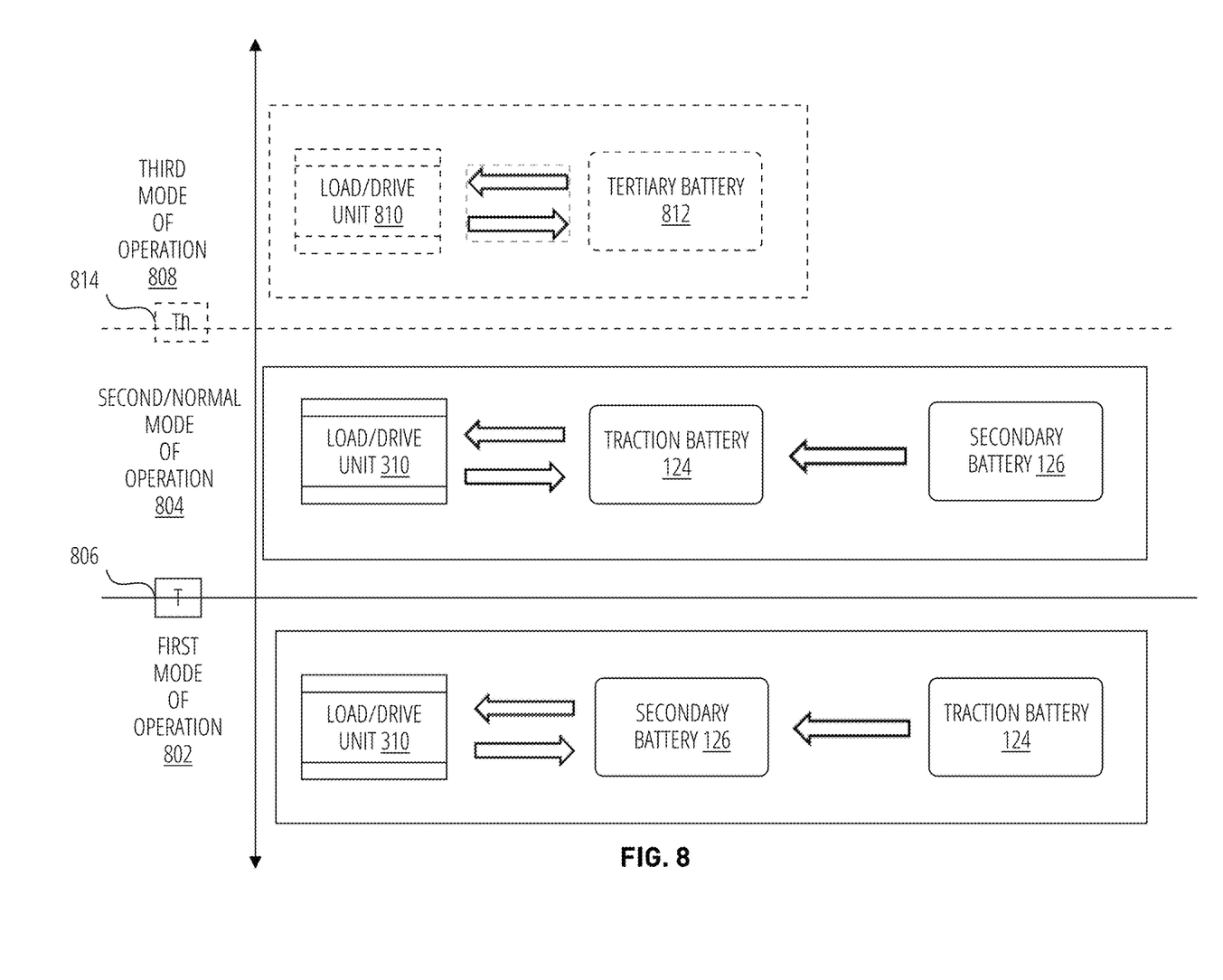
FIG. 8 depicts a block diagram showing modes of operation a power supply system in accordance with illustrative embodiments.

FIG. 8 shows another embodiment depicting a third mode of operation 808. The third mode of operation 808 may be performed in extreme high temperature conditions. Cold weather may not be the only factor that can influence driving range. For example, at 35° C., driving range may decrease by, for example, 17%. Though extreme high temperatures may play a role in reducing driving range, the use of HVAC (heating, ventilation, and air conditioning) systems like ACs (air conditioners) during said extreme high temperature conditions may have an even greater effect. By operating the vehicle in the third mode of operation 808, using tertiary batteries 812 configured with high temperature chemistries (chemistries that operate in a range of temperatures that include high temperatures of, for example, 35° C. or more, or 40° C. or more), the power output and range of the vehicle may be maintained. LTO typically has wider operation range in both low and high temperature conditions. Further, solid state batteries may be operated at high temperatures.

Herein, responsive to the measured temperature meeting a high temperature threshold condition (e.g., being above the low temperature threshold as well as at or above a high temperature threshold "Th") the switching device may be controlled to electrically couple a tertiary battery to the high voltage Direct Current (DC) bus. Further, to protect the traction battery 124 and/or secondary battery 126 from overheating due to their continued use, said traction and/or secondary batteries may be electrically decoupled from the high voltage dc bus 328 and or from each other. By so doing, a need for cooling circuits and devices to cool the batteries may not be necessary. Other technical features may be readily apparent to one skilled in the art from the descriptions, and claims.

Thus, a computer-aided method, system or apparatus, and computer program product are provided in the illustrative embodiments for power supply and other related features, functions, or operations. Where an embodiment of a portion thereof is described with respect to a type of device, the computer-implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include the computer-readable storage medium (or media) having the computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A computer-readable storage medium, including but not limited to computer-readable storage devices as used herein, is not to be construed as being transitory signals per se, such as radio waves or other freely propagating electromagnetic waves, electromagnetic waves propagating through a waveguide, or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Aspects of the present invention are described herein concerning flowchart illustrations and/or block diagrams of methods, apparatus (systems), and computer program products according to embodiments of the invention. It will be understood that computer readable program instructions can implement each block of the flowchart illustrations and/or block diagrams and combinations of blocks in the flowchart illustrations and/or block diagrams.

These computer-readable program instructions may be provided to a processor of a special purpose computer, a general-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    providing in a power supply system of an electric vehicle a traction battery comprising one or more traction modules;
    providing in the power supply system a secondary battery comprising one or more hybrid modules having one or more low temperature chemistries;
    determining a temperature of one or more cells using a temperature sensor; and
    responsive to the temperature meeting a low temperature threshold condition, operating a switching device in a first mode of operation in which the secondary battery is electrically coupled to a high voltage Direct Current (DC) bus to power a propulsion motor of a drive unit of the electric vehicle and the traction battery is electrically coupled to the secondary battery; and
    responsive to the temperature no longer meeting the low temperature threshold condition, operating the switching device in a second mode of operation in which the traction battery is electrically coupled to the high voltage DC bus to power the propulsion motor and the secondary battery is electrically coupled to the traction battery.

2. The method of claim 1, wherein the first mode of operation and the second mode of operation are dynamically switched to enable said power supply system to meet a power output requirement for a load of the electric vehicle regardless of ambient weather conditions.

3. The method of claim 1, further comprising:
    passively heating the traction battery, in the first mode of operation, via an internal resistance of one or more cells of the traction battery or external heating element, by discharging the traction battery to transfer power to the secondary battery while said secondary battery concurrently provides the electric vehicle with power via the high-voltage DC bus.

4. The method of claim 3, further comprising discontinuing said discharging responsive to computing that the temperature no longer meets the low temperature threshold condition.

5. The method of claim 1, further comprising:
    providing a corresponding bi-directional DC-DC-converter for each of the one or more hybrid modules; and
    controlling, via the corresponding bi-directional DC-DC-converter of a hybrid module, a charging and discharging of a plurality of cells of the hybrid module to produce a desired charge or discharge rate respectively.

6. The method of claim 5, wherein in the first configuration, the secondary battery is controlled to provide the electric vehicle with power, in a cold start process, at a same discharge rate as a discharge rate of the traction battery in the second mode of operation.

7. The method of claim 1, wherein the traction battery is electrically decoupled from the high voltage DC bus in the first mode of operation.

8. The method of claim 1, wherein the secondary battery is electrically decoupled from the high voltage DC bus in the second mode of operation.

9. The method of claim 1, wherein a low temperature threshold of the low temperature threshold condition is selected to be proportional to a temperature at which the one or more cells of the traction battery begin to experience a decrease in discharge capacity.

10. The method of claim 1, wherein one or more chemistries of the traction battery has a high cycle life.

11. The method of claim 10, wherein the high cycle life of 8000 cycles or more.

12. The method of claim 1, wherein the one or more low temperature chemistries of the secondary battery has a low cycle life and a high energy density.

13. The method of claim 12, wherein the low cycle life ranges from 4000 to 8000 cycles.

14. The method of claim 12, wherein the high energy density ranges from 700 1500 Wh/L.

15. The method of claim 1, wherein the one or more temperature sensors is a plurality of temperature sensors and wherein said temperature is determined by averaging a plurality of individual temperatures obtained from the plurality of temperature sensors.

16. The method of claim 1, wherein determining the temperature of the one or more cells is repeated at regular time intervals.

17. The method of claim 1, further comprising:
operating the power supply system in a third mode of operation, responsive to the temperature meeting a high temperature threshold condition, by operating the switching device to electrically couple a tertiary battery to the high voltage Direct Current (DC) bus,
wherein the tertiary battery has a high temperature chemistry.

18. A power supply system comprising:
a traction battery comprising one or more traction modules;
a secondary battery comprising one or more hybrid modules having one or more low temperature chemistries;
one or more temperature sensors; and
a switching device configured to connect or disconnect the secondary battery or the traction battery from a high-voltage DC (Direct Current) bus of an electric vehicle based on measurements of the one or more temperature sensors;
wherein the switching device is configured to, responsive to determining that the temperature meets a low temperature threshold condition, electrically couple the secondary battery to the high voltage DC bus to power a propulsion motor of a drive unit of an electric vehicle and electrically couple the traction to the secondary battery, and
wherein the switching device is further configured to, responsive to determining that temperature no longer meets the low temperature threshold condition, electrically couple the traction battery to the high voltage DC bus to power the propulsion motor and electrically couple the secondary battery to the traction battery.

19. The power supply system of claim 18, switching device is configured to dynamically switch the first mode of operation and the second mode of operation to enable meeting of a power output requirement regardless of ambient whether conditions.

20. The power supply system of claim 18, further comprising:
a corresponding bi-directional DC-DC-converter for each of the one or more hybrid modules;
wherein the corresponding bi-directional DC-DC-converter of a hybrid module is configured to control a charging and discharging of a plurality of cells of the hybrid module to produce a desired charge or discharge rate respectively.

21. The power supply system of claim 18, wherein the switching device comprises a contactor.

22. The power supply system of claim 18, wherein the one or more low temperature chemistries comprise modified liquid electrolytes which have lithium salts that remain molten at low to moderate temperature or Lithium titanite (LTO).

23. The power supply system of claim 18, wherein the one or more low temperature chemistries have a low cycle life which ranges from 4000 to 8000 cycles.

24. The power supply system of claim 18, wherein a low temperature threshold of the low temperature threshold condition is −20° C.

25. The power supply system of claim 18, wherein the power supply system does not have a battery heater.

26. The power supply system of claim 18, wherein each hybrid module comprises cells connected in series and the one or more hybrid modules is a plurality of high energy density hybrid modules that are connected in parallel, each high energy density hybrid module including a corresponding hybrid module controller (HMC), and each cell of the plurality of cells being independently measurable by the HMC.

27. The power supply system of claim 18, further comprising a tertiary battery comprising one or more hybrid modules having one or more high temperature chemistries;
wherein the switching device is configured to, responsive to determining that the temperature meets a high temperature threshold condition, electrically couple the tertiary battery to the high voltage DC bus.

28. The power supply system of claim 27, wherein the secondary and traction batteries are electrically decoupled from the high voltage DC bus.

29. The power supply system of claim 18, wherein the one or more low temperature chemistries are configured to increase a high temperature storage performance of the secondary battery.

30. A computer system comprising:
a processor; and
a memory storing instructions that, when executed by the processor, configure the system to:
determine a temperature of one or more cells of a power supply system using a temperature sensor; and
responsive to the temperature meeting a low temperature threshold condition, operate a switching device in a first mode of operation in which the secondary battery is electrically coupled to the high voltage Direct Current (DC) bus to power a propulsion motor of a drive unit of an electric vehicle and the traction battery is electrically coupled to a secondary battery; and
responsive to the temperature no longer meeting the low temperature threshold condition, operate the switching device in a second mode of operation in which the traction battery is electrically coupled to the high voltage DC bus to power the propulsion motor and the secondary battery is electrically coupled to the traction battery.

31. A non-transitory computer-readable storage medium storing instructions that when executed by a computer, cause the computer to:
determine a temperature of one or more cells of a power supply system using a temperature sensor; and
responsive to the temperature meeting a low temperature threshold condition, operate a switching device in a first mode of operation in which the secondary battery is electrically coupled to the high voltage Direct Current (DC) bus to power a propulsion motor of a drive unit of an electric vehicle and the traction battery is electrically coupled to a secondary battery; and
responsive to the temperature no longer meeting the low temperature threshold condition, operate the switching device in a second mode of operation in which the traction battery is electrically coupled to the high voltage DC bus to power the propulsion motor and the secondary battery is electrically coupled to the traction battery.

* * * * *